(12) United States Patent
Fujimoto

(10) Patent No.: US 9,124,926 B2
(45) Date of Patent: Sep. 1, 2015

(54) SERVER DEVICE AND NETWORK SYSTEM

(71) Applicant: Funai Electric Co., Ltd., Osaka (JP)

(72) Inventor: Munehiko Fujimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/046,039

(22) Filed: Oct. 4, 2013

(65) Prior Publication Data
US 2014/0143814 A1    May 22, 2014

(30) Foreign Application Priority Data

Nov. 20, 2012 (JP) ................................. 2012-254125

(51) Int. Cl.
*H04N 7/18* (2006.01)
*H04N 21/436* (2011.01)
*H04N 21/2343* (2011.01)
*H04N 21/258* (2011.01)

(52) U.S. Cl.
CPC ..... *H04N 21/43615* (2013.01); *H04N 21/2343* (2013.01); *H04N 21/25825* (2013.01)

(58) Field of Classification Search
USPC ................ 725/80, 85, 91, 100, 138–139, 141
See application file for complete search history.

(56) References Cited

U.S. PATENT DOCUMENTS

| 7,023,778 | B2* | 4/2006 | Takashima ................. 369/53.18 |
| 2010/0223407 | A1* | 9/2010 | Dong et al. ..................... 710/70 |

FOREIGN PATENT DOCUMENTS

JP        2007-013879 A    1/2007

* cited by examiner

Primary Examiner — Mulugeta Mengesha
(74) Attorney, Agent, or Firm — Osha Liang LLP

(57) ABSTRACT

A server device includes a communicating portion that sends content data through a communication network to a client machine and a controlling portion that acquires processing capability information of the client machine that plays back the content data, and generates a playback format list that includes playback format information corresponding to the content data, based on, at least, the processing capability information acquired for the client machine. The content data is converted into a playback format based on playback format information selected by the client machine side from the playback format list, and is sent through the communicating portion to the client machine.

19 Claims, 10 Drawing Sheets

PROCESS FLOW IN CONTROLLING PORTION IN THE SERVER DEVICE

"Playback History Information" Added to the Playback Format Information (Resource Information)

| Today's Date: 03/26/2012 GST | | |
|---|---|---|
| Title: ABC_D | Date of Last Playback | Publish? |
| Playback Format Information: Resource 0 | 01/31/2012 | O (Publish) |
| Playback Format Information: Resource 1 | 11/25/2011 | X (Do Not Publish) |
| Playback Format Information: Resource 2 | 04/12/2009 | X (Do Not Publish) |
| Playback Format Information: Resource 3 | 03/18/2012 | O (Publish) |

FIG. 8

SERVER DEVICE AND NETWORK SYSTEM

FIELD OF TECHNOLOGY

The present invention relates to a server device and a network system, and, in particular, relates to a server device and network system provided with a controlling portion for acquiring processing capability information of a client machine.

BACKGROUND ART

Conventionally, there have been known server devices provided with controlling portions for acquiring processing capability information of client machines, and network systems wherein such server devices are connected (referencing, for example, Patent Citation 1).

This Patent Citation 1 discloses a UPnP (Universal Plug and Play) network that includes a digital video camera and a digital television, where multimedia data (content data) stored on the digital video camera (server device) is sent to, and played on, a digital television (a client machine). In this UPnP network, the procedure for converting one content data, stored on the server device (the digital video camera) to a playback format (an MPEG format) that can be played back within the UPnP network regardless of the processing capability, or the like, of the client machines (digital televisions) is performed exclusively on the server device side. Given this, the structure is such that the content data that is converted into the MPEG format by the decision on the server device side is distributed to the client machine which has requested playback.

Moreover, in a home network technology, such as UPnP, that is structured by a server device and a plurality of client machines, the structure is such that playback (i.e., reproduction) format information (resource information), wherein details of a playback format wherein one content data, stored on the server device, is converted based on the processing capability of the server device, is stored internally in the form of a list. Moreover, the playback format list (i.e., reproduction format list) wherein the playback format information is listed is published on the home network.

PATENT CITATIONS

[Patent Citation 1] Japanese Unexamined Patent Application Publication 2007-13879

However, in the UPnP network set forth in this Patent Citation 1, the procedure for converting into a playback format that can be played back within the UPnP network is performed exclusively on the server device (digital video camera) side, without considering the processing capability, or the like, of the client machine (the digital television). In this case, the structure is such that the playback format list that is published on the UPnP network is structured from playback format information that is based on the processing capability of the server device. Because of this, even if the playback format information that is based on the server device side is published within the UPnP network, if the playback format that is converted based on the playback format information is different from a playback format that is played back suited to the processing capability of the client machine that that actually plays back the content, it may not be possible to achieve a playback operation that is suited to the client machine when playing back the content.

SUMMARY OF THE INVENTION

One or more embodiments of the present invention provide a server device and a network system, wherein a playback (i.e., reproduction) operation that is suited to a client machine can be achieved at the time of content playback (i.e., reproduction).

A server device according to a first aspect of the present invention may comprise: a communicating portion that sends content data through a communication network to a client machine; and a controlling portion that acquires processing capability information of the client machine that plays back the content data, and generates a playback format list that includes playback format information corresponding to the content data, based on, at least, the processing capability information acquired for the client machine, wherein the content data is converted into a playback format based on playback format information selected by the client machine side from the playback format list, and is sent through the communicating portion to the client machine.

As a result, in one or more embodiments, it is possible to playback on a client machine content data having a playback format that is suited to the processing capability of the client machine. That is, providing the server device with the controlling portion set forth above may enable the achievement a playback operation that is suited to the client machine at the time of content playback. Moreover, a playback format list that includes playback format information is generated by the controlling portion, which may make it possible to reference the playback format list on the client machine side to select easily playback format information that is suited to the processing capability of the client machine. That is, it may be possible to select individually playback format information that is suited to the processing capability of each individual machine, regardless of the number of client machines. Consequently, when a client machine is connected to a communication network that is structured using the server device according to one or more embodiments of the present invention, the performance capability of the client machine can be utilized effectively.

In one or more embodiments of the server device of the first aspect, described above, the processing capability information of the client machine may include display resolution information for display resolution that can be displayed by the client machine, and the controlling portion may produce the playback format list that includes the playback format information corresponding to the content data based on the display resolution information acquired for the client machine. Structuring in this way may cause the content to be distributed from the server device to the client machine after being put into a playback format adjusted to a display resolution that may enable the client machine to utilize its own performance capability effectively. This may enable playback on the client machine content having a playback format that is adjusted to the most suitable display resolution. That is, this may enable the achievement a playback operation wherein there is no loss of quality, when it comes to display resolution, for the user when the content is viewed at the time of content playback.

In one or more embodiments of the server device of the first aspect, described above, the controlling portion may ascertain a data transfer rate of the content data on the communication network depending on processing capability of the client machine, and the controlling portion may generate the playback format information corresponding to the content data into the playback format list based on the processing capability information for the client machine and on the data transfer rate that depends on the processing capability of the client machine. Structuring in this way may take into account not only the processing capability of the client machine alone when selecting the playback format information on the client machine side, but also the data transfer rate (communication throughput) from the server device to the client machine, which may depend on the processing capability of the client machine, in selecting the playback format information. This may make it possible for the client machine to receive content data from the server device in an environment with a data transfer rate that is suited to the processing capability of the client machine. This may also enable the reliable achievement of a content playback operation that is suited to the client machine at the time of content playback.

In one or more embodiments of the server device of the first aspect, described above, the playback format list may be published on the communication network, referenceably by the client machine, and the controlling portion may perform control so as to: acquire an operating status of the server device, make publishable to the client machine the playback format information in the playback format list that can be selected by the client machine side, when a processing load on the server device as discerned based on the operating status is small, and not publish to the client machine the playback format information in the payback format list that is evaluated as producing an impediment to playback operation in the client machine due to an increase in the processing load accompanying the conversion of the content data to the playback format, when the processing load on the server device is large. Structuring in this way may enable the number of playback format information that can be selected by the client machine to be increased or decreased in the playback format list based on the operating status of the server device (the processing status of the controlling portion, or the like). That is, it may be possible to structure the playback format list so as to publish to the client machine only the playback format information wherein playback is possible without impediment depending on the operating status of the server device. Moreover, because the number of playback format information is adjusted appropriately, the data size of the playback format list that is published in the communication network can be reduced.

One or more embodiments of the server device of the first aspect, described above, may further comprise a mobile information terminal driven by a battery, wherein the controlling portion performs control so as to: acquire remaining battery capacity information for the mobile information terminal and not publish to the client machine playback format information in the playback format list that is evaluated as producing an impediment to playback operation in the client machine due to an increase in the processing load accompanying the conversion of the content data to the playback format, when the remaining battery capacity in the server device, ascertained based on the remaining battery capacity information, is less than a specific amount. Structuring in this way may enable prevention, in advance, of the server device from falling into a state wherein operation is not possible, due to an inadequate battery capacity of a battery when converting the playback format based on the playback format information that is selected, when the server device is a mobile information terminal and the remaining stored power is less than a specific quantity.

In one or more embodiments of the server device of the first aspect, described above, playback history information may be added to the selected playback format information when content data is played back on the client machine, and the controlling portion may perform control so as to: make publishable to the client machine the playback format information in the playback format list for which a selection frequency, ascertained based on the playback history information, is relatively high, and not publish to the client machine playback format information in the playback format list for which the selection frequency is relatively low. Structuring in this way may enable the number of playback format information that can be selected on the client machine side within the playback format list to be increased or decreased based on playback history information of the content, which is added to the selected playback format information. That is, the more recent the point in time at which the playback format information has been selected, the more it remains able to be referenced with priority in the playback format list, while, old playback format information that was selected at a point in time that is relatively far in the past has the reference priority thereof demoted. The number of playback format information may be adjusted appropriately in this way, thus making it possible to reduce, to an appropriate size, the data size of the playback format list that is published within the communication network.

In one or more embodiments of the server device of the first aspect, described above, the server device and the client machine may each receive device certification through DLNA, and may be digital media server and a digital media player that can recognize each other by performing communication through a home network, the controlling portion may acquire processing capability information of the digital media player that plays the content data and generates a playback format list that includes playback format information corresponding to the content data, based on, at least, the processing capability information acquired for the digital media player, and the content data may be converted into a playback format based on the playback format information selected by the digital media player side from the playback format list, and sent to the digital media player through the communicating portion of the digital media server. Structuring in this way may enable content data that has been put into a playback format that is suited to the processing capability of the digital media player to be distributed from the digital media server to the digital media player in a home network that is structured from, at least, a digital media server and a digital media player. This may enable the digital media player to playback content data having a playback format that is suited to the processing capability of the local machine. Consequently, this may enable the achievement of a playback operation that is suited to the digital media player at the time of content playback.

A network system according to a second aspect of the present invention may comprise: a client machine; and a server device comprising: a communicating portion that sends content data through a communication network to the client machine, and a controlling portion that acquires processing capability information of the client machine that plays back the content data, and generates a playback format list that includes playback format information corresponding to the content data, based on, at least, processing capability information required for the client machine, wherein the structure is such that the content data is converted into a playback format based on playback format information selected by the client machine side from the playback format list, and is sent through the communicating portion of the server device to the client machine, to be played back by the client machine.

In one or more embodiments of the network system as set forth in the second aspect of the present invention, as described above, the controlling portion may ascertain a data transfer rate of the content data on the communication network depending on processing capability of the client machine, and the controlling portion may generate the playback format information corresponding to the content data into the playback format list based on the processing capability information for the client machine and on the data transfer rate that depends on the processing capability of the client machine. That is, the provision of the aforementioned controlling portion in the server device according to one or more embodiments may enable the achievement of a playback operation that is suited to the client machine at the time of playing back content using the network system. Moreover, a playback format list that includes playback format information may be generated by the controlling portion of the server device, making it possible, on the client machine side, to select easily playback format information matching the local processing capability by referencing the playback format list. That is, it is possible to select individually playback format information matching the process capability of each individual machine, regardless of the number of client machines. Consequently, in the network system according to one or more embodiments of the present invention, the performance capability of the client machine can be utilized effectively.

One or more embodiments of the present invention may enable the achievement a playback operation that is suited to the client machine at the time of content playback.

BRIEF DESCRIPTIONS OF THE DRAWINGS

FIG. 8 is a schematic diagram illustrating playback history information that is added to playback format information that is controlled by the server device in the second embodiment of the present invention.

DETAILED DESCRIPTION OF THE INVENTION

Embodiments of the present invention will be explained below based on the figures.

First Embodiment

A structure of a server device 10 according to a first embodiment of the present invention will be explained with reference to FIG. 1 through FIG. 5.

Figure 1:
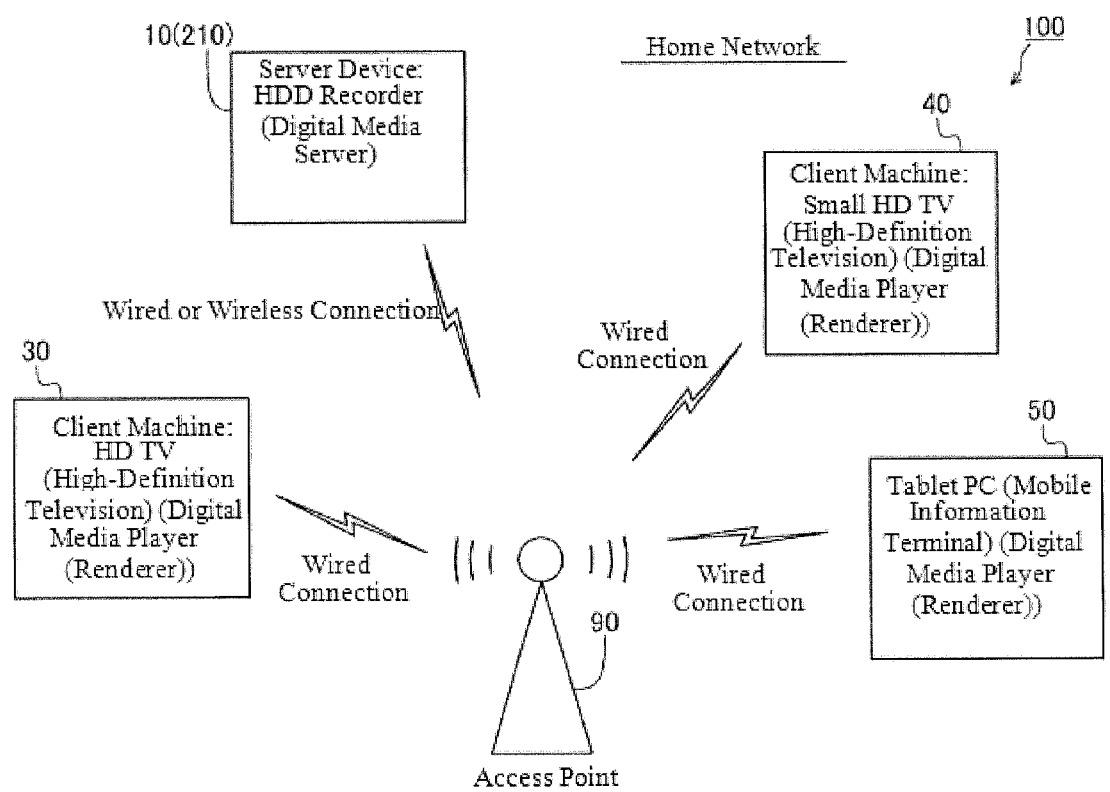
FIG. 1 is a schematic diagram illustrating a structure for a home network that uses a server device according to a first embodiment of the present invention.

As illustrated in FIG. 1, in a home network 100 that uses a server device 10 according to a first embodiment of the present invention, one server device 10 and three client machines 30, 40, and 50 may be disposed so as to be able to communicate with each other, either through wires or wirelessly, through an access point 90. The home network 100 is one example of a "communication network."

Here, the server device 10 and the client machines 30, 40, and 50 may be DLNA-Certified™ devices that have received device certification by the DLNA (the Digital Living Network Alliance). The server device 10 may be a digital media server (DMS), and an HDD recorder, or BD recorder, or the like, may be used in the server device 10. Moreover, the client machines 30, 40, and 50 may be digital media players (DMP) or digital media renderers (DMR), where, for example, BD players, television devices or stereo devices, or the like, are used in the client machines 30, 40, and 50. In the first embodiment, as one example, the client machine 30 is an HD TV (high-definition television set), the client machine 40 is a small HD TV, and the client machine 50 is a tablet PC (a mobile information terminal). Insofar as these are electronic devices that are DLNA-Certified™ devices, then, regardless of the manufacturer or the model, they can be connected together wirelessly, enabling the achievement of exchange of digital content between the electronic devices.

Consequently, in the below, the explanation envisions a case wherein a user operates the client machine 30 (40, 50) and the server device 10 selects digital content such as video, music, still pictures, or the like, that is stored on the local machine or on the home network 100, to playback, on the client machine 30 (40, 50), the selected digital content. For convenience in the description, FIG. 1 shows a configuration of a home network 100 illustrating only one server device 10 and three client machines 30, 40, and 50. The explanation below will use the client machine 30 as a representative example of the three client machines 30, 40, and 50, unless specifically indicated otherwise.

Figure 2:
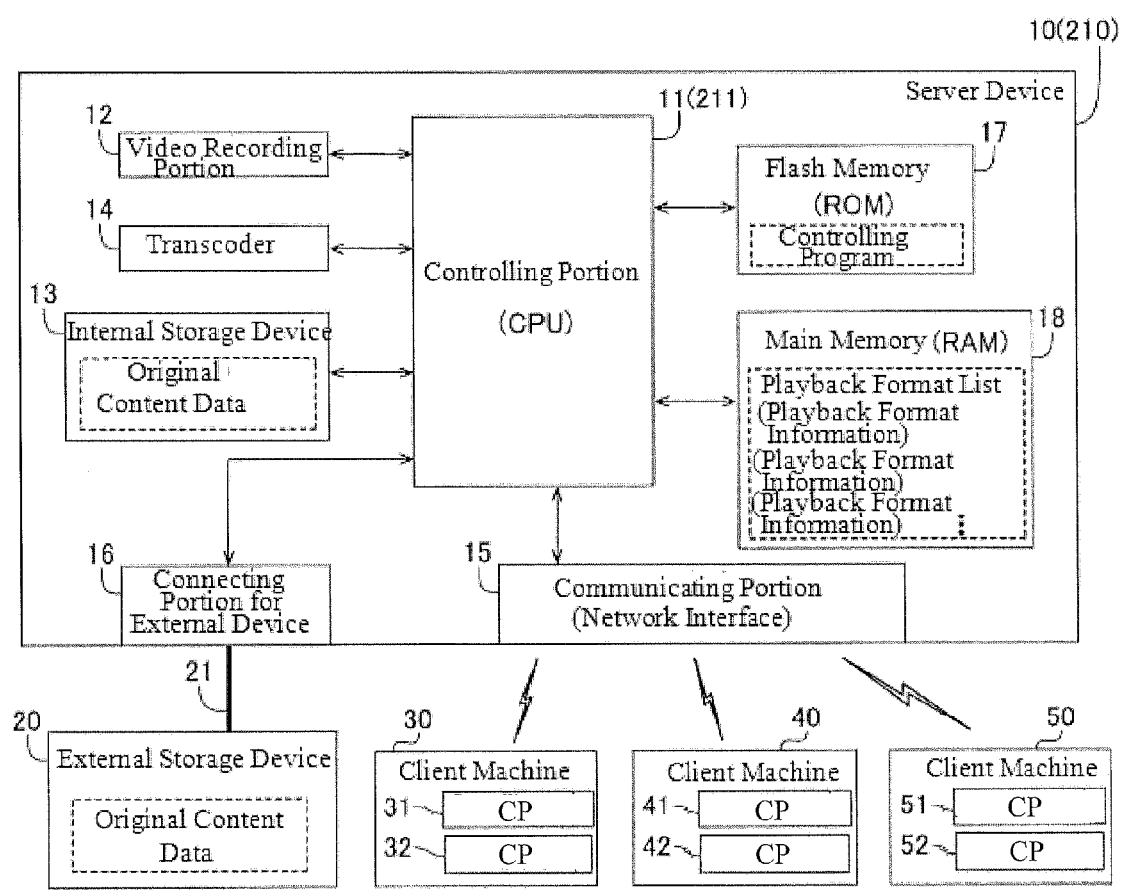
FIG. 2 is a block diagram illustrating the structure of a server device and a client machine in a home network according to a first embodiment of the present invention.

The server device 10, as illustrated in FIG. 2, may be provided with a controlling portion 11, a video recording portion 12, an internal storage device 13, a transcoder 14, a communicating portion (a network interface) 15, and an external device connecting portion 16. Moreover, the server device 10 may be further provided with a flash memory (ROM) 17 and a main memory (RAM) 18. Moreover, the server device 10 may be configured so as to be able to receive television programs (video data) through a tuner portion (not shown) that is connected to a rooftop antenna or cable circuit, not shown. The controlling portion 11 is one example of a "controlling portion" and an "acquiring portion."

The controlling portion 11 comprises a CPU, and may have functions for directing the control of the server device 10 through executing a control program. The video recording portion 12 may have a function for digital video recording of video data made from still images and/or motion pictures, including music (audio) (original content data such as television programs, and the like). The internal storage device 13 may have a function for storing digital video data (the original content data) recorded by the video recording portion 12.

The transcoder 14 may have a function for performing an encoding procedure on the original content data stored in the internal storing device 13, based on an instruction from the controlling portion (CPU) 11. The original content data is converted, through this encoding procedure, into a different data format by, for example, compressing in order to control the data size. For this encoding method, an encoding method intended for low-bit-rate applications, which preserves the original resolution of the content data but transcodes into an encoding method of a compression rate (a data sampling quantity) or a high compression rate (for example, a procedure for transcoding from the MPEG-2 format to the H.264 format) may be executed.

Moreover, the communicating portion 15 may have a function for sending the content data, after the encoding procedure, through the home network 100 to the client machine 30 from a request for a playback operation was received, based on an instruction from the controlling portion 11. Moreover, the external device connecting portion 16 may have the role of an interface for connecting an external storage device 20, such as an HDD device that is connected, as an external device, to the server device 10. In this example, the server device 10 and the external storage device 20 are connected through a cable 21. The server device 10 and the external storage device 20 may be connected wirelessly instead, rather than using the cable 21.

Moreover, control programs executed by the controlling portion 11, and the like, may be stored in the flash memory (ROM) 17. Moreover, the main memory (RAM) 18 may be used as a working memory for the temporary storage of control parameters that are used when the control program is executed.

Additionally, as illustrated in FIG. 2, a client machine 30, as a DMP or DMR, may be provided with a controlling portion 31, and a communicating portion 32 for both receiving control commands from the server device 10, based on control by the controlling portion 31, and communicating the operating status of the local machine to the server device 10. The client machine 40 (50) may also be provided with a controlling portion 41 (51) and a communicating portion 42 (52) that have the same functions as the controlling portion 31 and the communicating portion 32 in the client machine 30.

The individual machines (the server device 10, and the client machines 30, 40, and 50) that structure the home network 100 (referencing FIG. 1), having the configuration set forth above, may be structured so as to enable the content that is stored on the server device 10, or the external storage device 20 connected to the server device 10, to be sent to the client machine 30 based on a playback operation request from the client machine 30, and to be played by the client machine 30. At this time, in the first embodiment, when content data is sent to the client machine 30 from the server device 10, an encoding procedure is performed by the transcoder 14 on the original content data to convert it from the form of the original content data to a playback format wherein the client machine 30 can play it back in an environment wherein the client machine 30 can best utilize its performance capability.

Figure 3:
FIG. 3 is a schematic diagram illustrating one example of a playback format list that is published on the network by a server device according to the first embodiment of the present invention.

Moreover, as illustrated in FIG. 3, the server device 10 may be structured so as to generate internally, based on an instruction by the controlling portion 11, "playback format information (resource information)" that describes the details of the playback format (information indicating how the content is to be presented by the client machine 30 (40, 50) (the playback format)) to be produced as a result of the encoding process on the individual original content data (referencing FIG. 2) that is stored in the server device 10 or the external storage device 20. Moreover, for a single original content data there may be a plurality of playback format information, where the structure is such that the plurality of playback format information are organized into the form of a list, to produce a playback format list, within the server device 10. The playback format list may be stored in the main memory 18. The details of the playback format list will be described below.

In one example, as illustrated in FIG. 3, in the "playback format list," for the single original content data that has the content title of "ABC_D," and which is stored as a "Science Fiction Movie," this means that it is content that can be subjected to an encoding process based on four types of playback format information: "Resource 0," "Resource 1," "Resource 2," and "Resource 3." Moreover, in the playback format list, there is original content data recorded that are named "EFG_H," "IJK_L," and "NMO_P," as other title names. Each of these has respective four types of playback format information, "Resource 0," "Resource 1," "Resource 2," and "Resource 3." The "Resource 0," "Resource 1," "Resource 2," and "Resource 3" written in the list in FIG. 3 are one example of "playback format information" in the present invention.

In this example, when it comes to the content of the title "ABC_D," "Resource 0" has a meaning, as the playback format information, that the original content data will be converted into a playback format wherein the bit rate (data transfer rate) is 15 Mbps, and the display resolution has 1920×1080 pixels. Moreover, "Resource 1" has a meaning, as the playback format information, that the conversion will be into a playback format wherein the bit rate (data transfer rate) is 8 Mbps, and the display resolution has 1920×1080 pixels. Similarly, "Resource 2" has a meaning, as the playback format information, that the conversion will be into a playback format wherein the bit rate (data transfer rate) is 15 Mbps, and the display resolution has 1280×720 pixels. Moreover, "Resource 3" has a meaning, as the playback format information, that the conversion will be into a playback format wherein the bit rate (data transfer rate) is 3 Mbps, and the display resolution has 1280×720 pixels. The display resolution is one example of "client machine processing capability information" in the present invention.

Moreover, in one example, in contrast to "Resource 0" being playback format information (resource information) corresponding to the playback format corresponding to the original content data itself, "Resource 1" is playback format information (resource information) for converting to a playback format that is suited to the client machine 30, which has the processing capability oh an HD TV (a high-definition television set). Moreover, "Resource 2" is playback format information for converting into a playback format that is suited to the client machine 40, which has the processing capability of a small HDTV. Similarly, "Resource 3" is playback format information for converting into a playback format that is suited to the client machine 50, which has the processing capability of a table PC.

That is, in the first embodiment, when it is sensed by the server device 10 side that the client machines 30, 40, and 50 have been plugged into the home network 100, the processing capability information of the client machines 30, 40, and 50 are acquired first based on an instruction from the controlling portion 11 of the server device 10. The structure may be such that, given this, a single playback format list that includes, in addition to the playback format information for "Resource 0" that is stored in advance on the server device 10 side, playback format information comprising "Resource 1," "Resource 2," and "Resource 3," based on the processing capability information of the individual client machines, newly acquired. Moreover, the structure is such that, in the playback format list, illustrated in FIG. 3, the playback format information of "Resource 0," "Resource 1," "Resource 2," and "Resource 3" are assigned to each of the content titles of "ABC_D," "EFG_H," "IJK_L," and "NMO_P."

Consequently, in the first embodiment, the structure is such that not only is the content data converted, by the transcoder 14, into a playback format that is based on one of "Resource 1," "Resource 2," or "Resource 3," in the playback format list (referencing FIG. 3), selected individually by the client machine 30 (40, 50) side, but also such that it is sent through the communicating portion 15 to the client machine 30 (40, 50). In other words, the content is converted into a playback format that is suited to the processing capability of the client machine 30 (40, 50) and then distributed from the server device 10 to the client machine 30 (40, 50). As a result, the structure is such that content data that is adjusted to a playback format that is suited to the process capability of the client machine can be played back by the client machine 30 (40, 50).

While in FIG. 3 there are references to only four types of playback format information, "Resource 0, 1, 2, and 3" for each of the contents, the number of playback format information (the number of resources) may also increase or decrease in accordance with the number of client machines that are connected to the home network 100 (referencing FIG. 1).

Moreover, in the present embodiment, the processing capability information for the client machine 30 (40, 50) may include, as described above, display resolution information that enables the client machine 30 (40, 50) to best utilize the performance capability of the local machine. Consequently, the "Resource 1," "Resource 2," and "Resource 3" in the single playback format list (referencing FIG. 3) are each information, recorded on the server device 10 side, reflecting the display resolutions that are each one element of the processing capabilities of the client machines 30, 40, and 50, acquired by the controlling portion 11. The display resolution is one example of the "display resolution information" in the present invention.

Moreover, in the first embodiment, the structure may be such that the controlling portion 11, in addition to acquiring the processing capability information (the display resolution information) for the client machine 30 (40, 50), also ascertains the data transfer rate (the bit rate (the communication throughput)) of the content data on the home network 100, depending on the processing capability of the client machine 30 (40, 50), as described above. Furthermore, the structure may be such that a single playback format list that includes "Resource 1," "Resource 2," and "Resource 3," as playback format information, is generated by the controlling portion 11 based not only on the display resolution information for the client machine 30 (40, 50), but also on the data transfer rate (bit rate) that depends on the processing capability of the client machine 30 (40, 50) in the home network 100.

Moreover, the structure may be such that the "playback format list," illustrated in FIG. 3, is information that is published so as to be referenceable by the client machine 30 (40, 50) on the home network 100.

In the first embodiment, the structure may be such that, in this case, the operating status of the server device 10 (the operating statuses of the controlling portion 11, the transcoder 14, the communicating portion 15, and the like) is also acquired by the controlling portion 11. Moreover, the structure may be such that when the processing load on the server device 10, ascertained based on the operating status of the server device 10, is small, the content of the playback format list, of the playback format information that can be selected on the client machine 30 (40, 50) side, is modified (corrected) automatically so as to enable publication, to the client machine 30 (40, 50).

Moreover, the structure may be such that when the processing load on the server device 10, evaluated based on the operating status that is obtained, is high, that playback format information that is evaluated as producing an impediment to playback operations by the client machine 30 (40, 50), resulting from an increase in the load resulting from conversion of the content into the playback format (the encoding procedure) is removed (discarded) from the playback format list by the controlling portion 11, in the opposite of the case wherein the processing load on the server device 10 is low.

Figure 4:
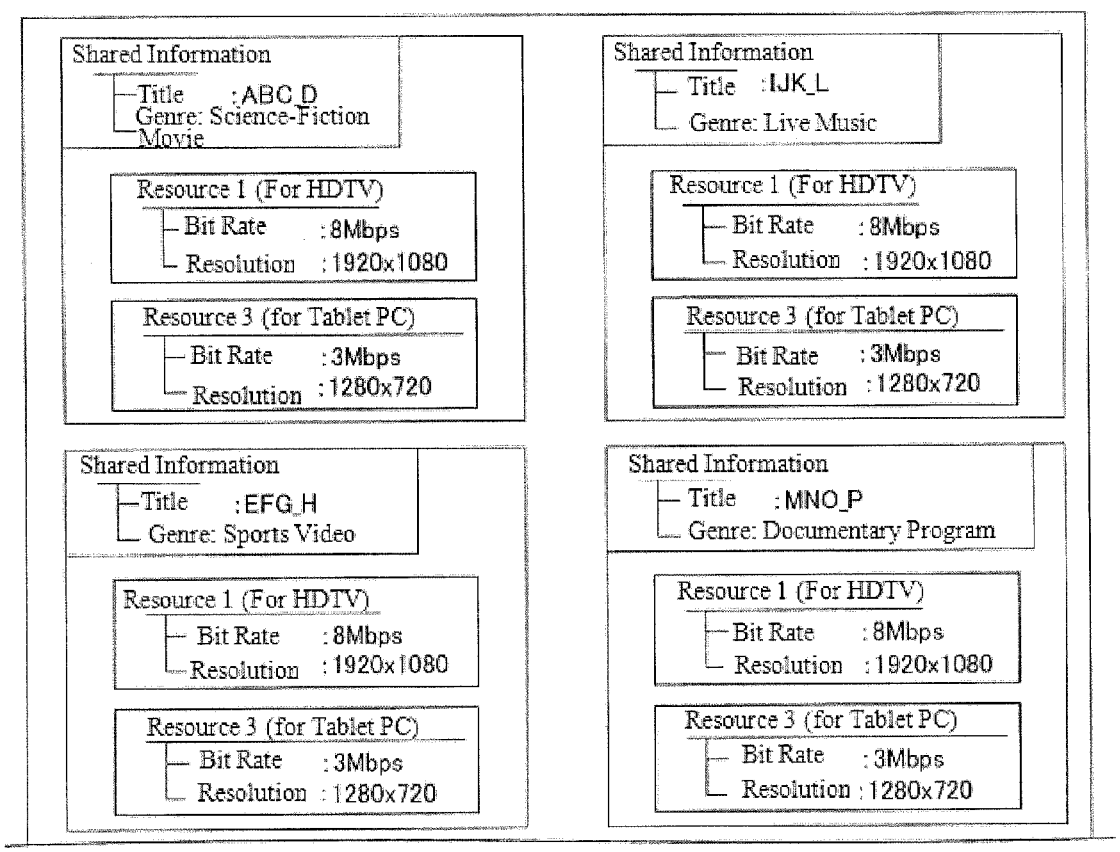
FIG. 4 is a schematic diagram illustrating another example of a server device according to the first embodiment of the present invention.

Citing a specific example, if, for example, the server device 10 is connected to the home network 100 through a wireless LAN that is nominally 54 Mbps, the data transfer rate (communication throughput) with the client machine 30 (40, 50) will be, at best, about 10 Mbps, and thus, in the playback format list, illustrated in FIG. 3, the playback format information for "Resource 0" and "Resource 2," where the data transfer rate is higher than 10 bps, will be changed to non-public handling. That is, as illustrated in FIG. 4, the structure is such that the playback format information for only "Resource 1" and "Resource 3" in the playback format list can be published to the client machine 30 and the client machine 50. In this case, the playback format information that can be selected by the client machine 40, which is a small HDTV, is deleted from the playback format list, and so no longer exists. As a result, when it comes to the number of playback format information that can be selected on the client machine 30 (40, 50) side, an increase or decrease (in this case, a decrease) is achieved in the playback format list based on the operating status of the server device 10, from that which is shown in FIG. 3 to that which is shown in FIG. 4, reducing the data size in the playback format list to an appropriate scope (an intermediate level). That is, the structure may be such that the playback format list is corrected so as to publish to the client machine 30 (40, 50) only the playback format information wherein playback is possible without impediment, depending on the operating status of the server device 10.

In this way, in the home network 100 in the first embodiment, a playback format list that includes playback format information corresponding to the content is published based on the processing capability information for the client machine 30 (40, 50) (the display resolution information and the data transfer rate, taking the communication network into account), thus enabling content that has a playback format that is suited to the processing capability of the individual machine to be played in the client machine 30 (40, 50). That is, if only playback format information based on the processing capability of the server device 10, such as presented in the playback format information of "Resource 0," were to be published on the home network 100, then it would not be possible to achieve an agreeable playback operation on a client machine wherein the playback processing capability is inadequate for the playback format of "Resource 0," such as the client machine 50 that is a tablet PC. On the other hand, the generation internally of playback format information that is based on the processing capabilities of the client machines, such as in the server device 10, ensures optimal playback operations on the individual client machines.

In this way, in the first embodiment, the home network 100 is structured from the server device 10, and the client machines 30, 40, and 50.

FIG. 1 through FIG. 4 will be referenced next to explain the process flow in the controlling portion 11 when digital content is played back on the client machine 30 (40, 50) using the server device 10 according to the first embodiment. The explanation below describes one example of a control process flow in the controlling portion 11 (referencing FIG. 10) relating to the control operations of the server device 10 (referencing FIG. 2) in the case wherein the client machines 30, 40, and 50 (referencing FIG. 1) are newly connected to the home network 100 (referencing FIG. 1) from a state wherein no client machine was connected to begin with.

Figure 5:
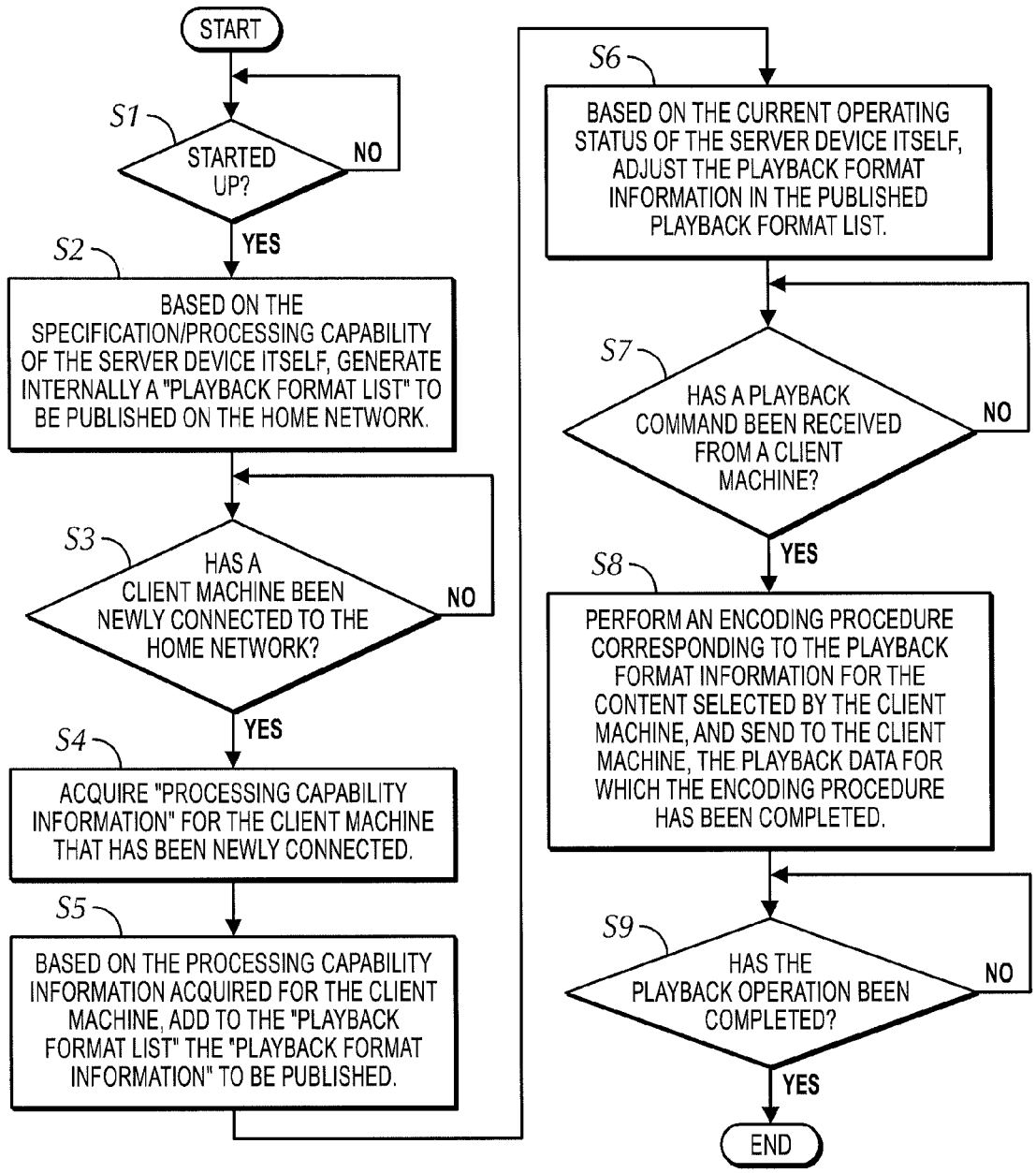
FIG. 5 is a diagram showing the flow of control in the controlling portion when playing back content data on a client machine using the server device of the first embodiment of the present invention.

For example, as illustrated in FIG. 5, in Step S1 there is an evaluation by the controlling portion 11 (referencing FIG. 2) as to whether or not the server device 10 (referencing FIG. 2) itself has been started up, where this evaluation is repeated until there is an evaluation that the server device 10 itself has been started up.

When, in Step S1, the evaluation by the controlling portion 11 is that the server device 10 itself has been started up, then, in Step S2, a playback format list (referencing FIG. 3) regarding digital video data (original content data) that is stored in the internal storage device 13 (referencing FIG. 2), or the external storage device 20 (referencing FIG. 2), is generated by the controlling portion 11 based on the specifications (the processing capability, and the like) of the server device 10. That is, the displaying resolution and bit rate, and the like, as published information on the home network 100, for the digital video data is determined by the controlling portion 11 based on the specifications of the server device 10 itself, and that information is written in the playback format list. In this case, "Resource 0" is recorded first in the playback format list as the playback format information that is based on the specifications of the server device 10 itself.

Following this, in Step S3, there is an evaluation by the controlling portion 11 as to whether or not a new client machine has been connected to the home network 100, where this evaluation repeats until a client machine is newly connected to the home network 100.

When, in Step S3, there is an evaluation by the controlling portion 11 that a client machine has been newly connected to the home network 100, processing advances to Step S4. In the explanation below, a "Yes evaluation" in Step S3 means that the three client machines 30, 40, and 50 have been connected to the home network 100.

Here, in the first embodiment, in Step S4, processing capability information for each of the individual client machines 30, 40, and 50 is obtained based on commands from the controlling portion 11 in the server device 10. That is, the client machines 30, 40, and 50 each already have information on the display resolutions that are the processing capabilities of these devices, and on information on the maximum throughputs (the data transfer rates) in data communication with the server device 10. Consequently, a specific communication command (command signal) is sent by the controlling portion 11 through the communicating portion 15 (referencing FIG. 2) to the client machines 30, 40, and 50, and processing capability information is acquired for each of the client machines.

Continuing with this example, in Step S5, three separate playback format information, namely "Resource 1," which is based on the processing capability of the client machine 30, "Resource 2," which is based on the processing capability of the client machine 40, and "Resource 3," which is based on the processing capability of the client machine 50, are added new and recorded in the playback format list based on the respective processing capability information (display resolution information and data transfer rates) of the client machines 30, 40, and 50, acquired in Step S4, in addition to the playback format information that has already been recorded as "Resource 0." That is, as illustrated in FIG. 3, a playback format list in a state wherein four types of playback format information, specifically "Resource 0," "Resource 1," "Resource 2," and Resource 3" have been added and registered, for each the individual contents, titled "ABC_D," "EFG_H," "IJK_L," and "NMO_P," is generated in the server device 10.

Next, in Step S6, in the first embodiment, the operating status of the server device 10 at the current point in time (the operating statuses of the controlling portion 11, the transcoder 14, the communicating portion 15, and the like) is acquired in the server device 10 based on an instruction from the controlling portion 11. In this case, if the processing load on the server device 10, ascertained based on the operating status of the server device 10, is small, then control is performed wherein the content of the playback format list is corrected automatically so as to enable publication, to the client machine 30 (40, 50) of the playback format information that can be selected by the client machine 30 (40, 50) side in the playback format list.

If, at the time of the procedure in Step S6, the processing load on the server device 10 is large, then an editing operation is performed so that playback format information that can be evaluated as producing an impediment to the playback operation in the client machine 30 (40, 50) due to an increase in the processing load accompanying the conversion of the content into the playback format is removed (deleted) from the playback format list. Consequently, there may be a case wherein a playback format list that is published on the home network 100 will transition from the content shown in FIG. 3 to the content shown in FIG. 4.

Following this, in Step S7, an evaluation is performed by the controlling portion 11 as to whether or not the server device 10 has received a playback command from the client machine 30 (40, 50), where the evaluation is repeated until there is an evaluation that the server device 10 has received a playback command from a client machine.

When, in Step S7, there has been an evaluation by the controlling portion 11 that the server device 10 has received a playback command from a client machine, processing advances to Step S8. Here, a "Yes evaluation" in Step S7 means that a content data playback request (playback command) has been sent from the client machine 30 to the server device 10.

Consequently, in Step S8, content data is distributed from the server device 10 to the client machine 30, based on an instruction from the controlling portion 11, so as to respond to the request signal from the client machine 30. At this time, in the server device 10 an encoding procedure is performed on the original content data, by the transcoder 14, to convert from the format of the original content data to a playback format that can be played back by the client machine 30. Explaining using the example illustrated in FIG. 3, the original content data titled "ABC_D," for example, is subjected to an encoding procedure based on the playback format information of "Resource 1" that corresponds to the processing capability information for the client machine 30. That is, the original content data is converted into a playback format wherein the bit rate is 8 Mbps and the display resolution is 1920×1080 pixels. Moreover, in Step S8, along with the encoding procedure, the content data is sent to the client machine 30, based on an instruction from the controlling portion 11, sequentially from the data for which the encoding procedure has been completed.

Continuing with this example, in Step S9, an evaluation is performed by the controlling portion 11 as to whether or not the playback operation of the content data in the client machine 30 has been completed, where this evaluation is repeated until there is an evaluation that the playback operation of the content data in the client machine 30 has been completed.

When, in Step S9, there is an evaluation by the controlling portion 11 that the playback of the content in the client machine 30 has been completed, this control procedure in the server device 10 is ended.

In the first embodiment, as illustrated in the example above, the server device 10 and the client machine 30 (40, 50) have each received machine certification through the DLNA as a digital media server (DMS) and digital media player (DMP) that can recognize each other through communicating together over the home network 100. Moreover, the server device 10 may be provided with the controlling portion 11 that generates the playback format list that includes playback format information ("Resource 0," "Resource 1," "Resource 2," and "Resource 3," and the like) corresponding to the content data based on the processing capability information that has been acquired for the client machine 30 (40, 50). Given this, the content data is converted into a playback format based on the playback format information selected by the client machine 30 (40, 50) side from the playback format list and sent to the client machine 30 (40, 50) through the communicating portion 15, and thus the content data is converted into a playback format suited to the processing capability of the client machine 30 (40, 50) and distributed from the server device 10 to the client machine 30 (40, 50). As a result, content data having a playback format that is suited to the processing capability of the local machine can be played back by the client machine 30 (40, 50). That is, the provision of the controlling portion 11, described above, may enable the server device 10 to achieve a playback operation that is suited to the client machine 30 (40, 50) at the time of content playback.

In the first embodiment, a playback format list that includes the playback format information is generated by the controlling portion 11, and thus, the playback format list (referencing FIG. 3) can be referenced, on the client machine 30 (40, 50) side, enabling playback format information (referencing FIG. 3) suited to the processing capability of that machine to be selected easily. That is, this may enable the individual selection of playback format information that is suited to the processing capabilities of the individual machine, regardless of the number of client machines 30 (40, 50). Consequently, when a client machine 30 (40, 50) is connected to a home network 100 that is structured using the server device 10, the performance capability of each of the client machines 30, 40, and 50 can be utilized effectively.

Moreover, in the first embodiment, the controlling portion 11 may be structured so as to generate a playback format list that includes playback format information corresponding to each content data ("Resource 0," "Resource 1," "Resource 2," and "Resource 3," and the like), based on the display resolution information acquired for the client machine 30 (40, 50), with the processing information for the client machine 30 (40, 50) including the display resolution information for the resolutions that can be displayed by the client machine 30 (40, 50). As a result, the content data is put into a playback format adjusted to the display resolution wherein the client machine 30 (40, 50) can best utilize its performance capability, and is distributed from the server device 10 to the client machine 30 (40, 50), and thus content data having a playback format that is adjusted to the optimal display resolution can be played back by the client machine 30 (40, 50). That is to say, a playback operation wherein there is no reduction in quality for the user, when it comes to the display resolution, when the content is viewed can be achieved at the time of content playback.

Moreover, in the first embodiment, the controlling portion 11 may be structured so as to ascertain the data transfer rate of the content on the home network 100 depending on the processing capability of the client machine 30 (40, 50), in addition to acquiring processing capability information for the client machine 30 (40, 50). Given this, the controlling portion 11 may be structured so as to generate, into a playback format list, playback format information, corresponding to the content data, based on the processing capability information for the client machine 30 (40, 50) and the data transfer rate (communication throughput) that depends on the processing capability of the client machine 30 (40, 50). As a result, when playback format information ("Resource 0," "Resource 1," "Resource 2," or "Resource 3," and the like) is selected on the client machine 30 (40, 50) side, playback format information that takes into consideration not only the processing capability of the client machine 30 (40, 50) alone, but also the data transfer rate from the server device 10 to the client machine 30 (40, 50), which depends on the processing capability of the client machine 30 (40, 50), can be selected. As a result, the client machine 30 (40, 50) can receive content data from the server device 10 in a data transfer rate environment matching the local processing capability. As a result of this as well, a content playback operation that is suited to the client machine 30 (40, 50) can be achieved reliably at the time of content playback.

Moreover, in the first embodiment the playback format list may be published so as to be referenceable by the client machine 30 (40, 50) on the home network 100. Given this, the controlling portion 11 may be structured to perform control so as to not only acquire the operating status of the server device 10, but also to enable publication, to the client machine 30 (40, 50), in the playback format list, of the playback format information that can be selected by the client machine 30 (40, 50) side when the processing load on the server device 10, which can be ascertained based on the operating status, is low, and also so as to delete, without publishing to the client machine 30 (40, 50), in the playback format list, playback format information evaluated as producing an impediment to the playback operation in the client machine 30 (40, 50) due to an increase in the processing load accompanying the conversion of the content data to the playback format when the processing load on the server device 10 is large. As a result, it is possible to increase or decrease the number of playback format information that can be selected in the playback format list on the client machine 30 (40, 50) side depending on the operating status of the server device 10 (such as the processing status of the controlling portion 11). That is, the playback format list can be structured so that only the playback format information wherein playback is possible without obstruction, depending on the operating status of the server device 10, is published to the client machine 30 (40, 50). Moreover, the number of playback format information may be adjusted appropriately, enabling a reduction of the data size of the playback format list that is published on the home network 100.

Alternate Example of the First Embodiment

An alternate example of the first embodiment will be explained next referencing FIG. 2, FIG. 3, FIG. 6, and FIG. 7. Unlike the first embodiment, set forth above, in the alternate embodiment, the explanation will be for a case wherein a mobile information terminal (smart phone) that is driven by a battery 72 is used for the server device 70 (referencing FIG. 6). In the figures, those structures that are identical to those in the first embodiment are illustrated with the same codes as in the first embodiment.

Figure 6:
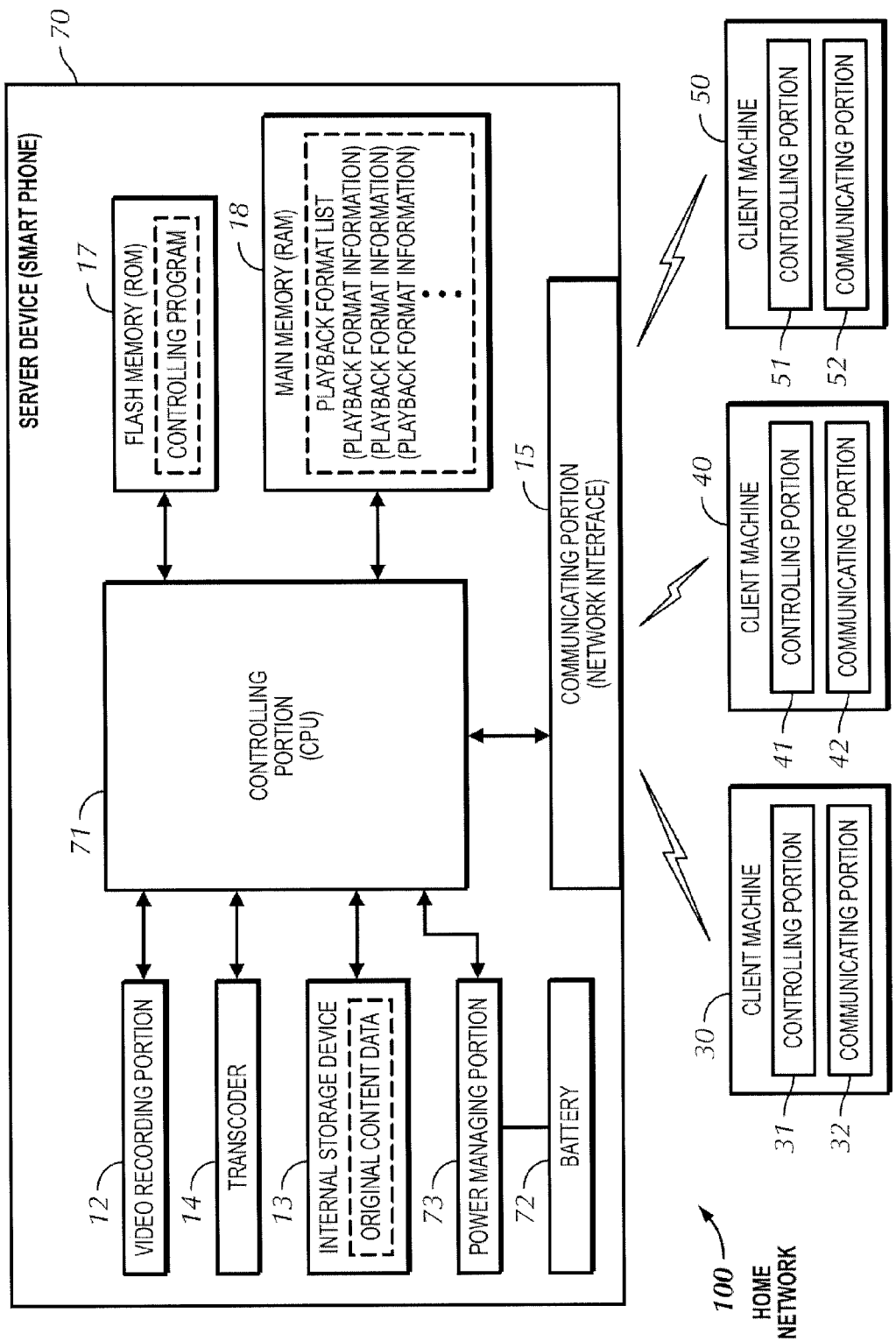
FIG. 6 is a block diagram illustrating a configuration of a server device and client machines in a home network according to a modified example of the first embodiment of the present invention.

As illustrated in FIG. 6, the server device 70, as a mobile information terminal according to a modified example of the first embodiment of the present invention, may be provided with a controlling portion 71, a battery 72, and a power managing portion 73. On the other hand, no external storage device 20, or the like, may be connected as there was with the server device 10 (referencing FIG. 2) in the first embodiment, set forth above. Consequently, the digital video data (original content data) may be stored in only the internal storage device 13.

Here, in the modified example of the first embodiment, the structure may be such that the following control information is added through the server device 70 being a mobile information terminal. Specifically, the structure may be such that remaining battery capacity information for the battery 72 is obtained in real time, under the control of the power managing portion 73, based on an instruction from the controlling portion 71 in the server device 70. Moreover, the structure may be such that if the remaining battery capacity of the server device 70 (of the battery 72) that is ascertained based on the remaining battery capacity information that has been acquired is less than a specific amount, specific playback format information is removed (deleted) from the playback format list. Such playback format information that is removed may be the playback format information evaluated as producing an impediment to the playback operation in the client machine 30 (40, 50) due to an increase in the processing load accompanying a conversion of the content data to that playback format despite there being little remaining battery capacity.

Figure 7:
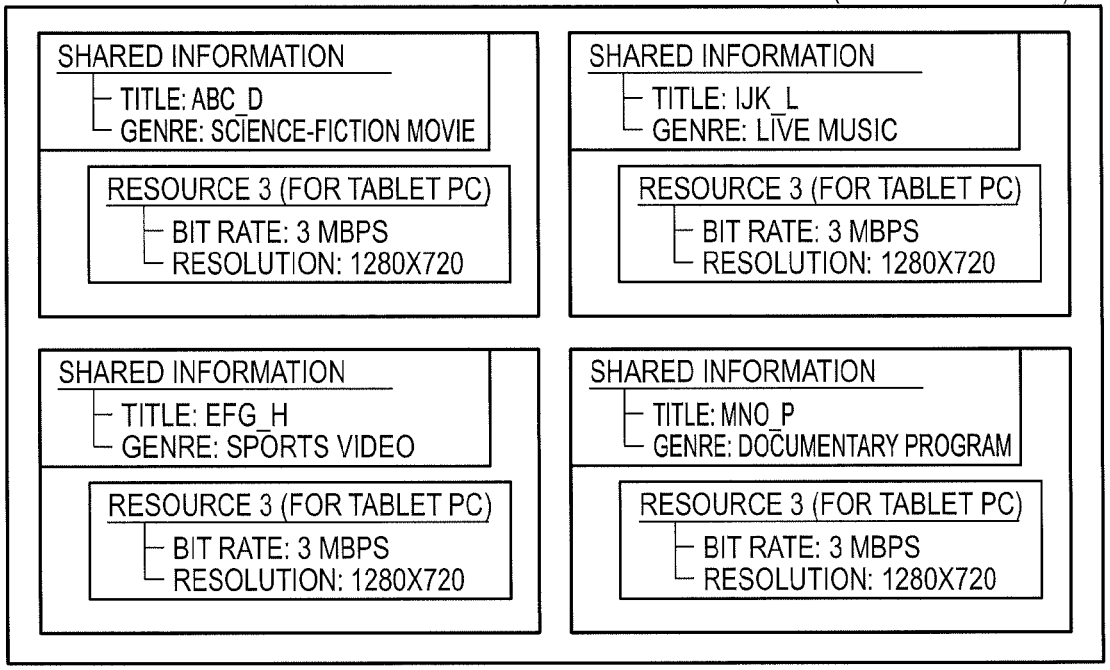
FIG. 7 is a schematic diagram illustrating the configuration of a server device according to a modified example of the first embodiment of the present invention.

Citing one example, based on the lack of remaining battery capacity in the battery 72, the playback format information of "Resource 0," "Resource 1," and "Resource 2," wherein the data transfer rate is greater than 3 Mbps, is changed to be handled as non-published (in this case, handled through deletion). That is, as illustrated in FIG. 7, the structure may be such that only the playback format information of "Resource 3" can be published, in the playback format list, to the client machine 50, which is a tablet PC. Consequently, in the playback format list there may be no playback format information selectable by the client machine 30, which is an HD TV, or the client machine 40, which is a small HD TV. In this way, an increase or decrease (in this case, a decrease) in the number of playback format information that can be selected on the client machine 30 (40, 50) side in the playback format list is achieved based on the remaining battery capacity of the battery 72 in the server device 70.

Moreover, by only the playback format information of "Resource 3" being published, the time over which the server device 70 is driven can be extended to the extent that the processing loads on the controlling portion 11, the transcoder 14, and the communicating portion 15, and the like, may be curtailed, despite the remaining battery capacity of the server 70, which is a mobile information terminal, being below the specific value, because despite the content data having a playback format based on "Resource 3" being played back by the client machine 50, the data transfer rate from the server device 70 to the client machine 50 is reduced to 3 Mbps. In this way, the structure may be such that even in the unique use environment of the server device 70 being a mobile information terminal, the playback format list is modified (corrected) in accordance with the operating status (the machine performance capability) of the server device 70 so as to publish, to the client machine 30 (40, 50) only the playback format information wherein the content data can be played back without impediment.

The other structures of the server device 70 in the modified example of the first embodiment may be identical to the structures of the server device 10 (referencing FIG. 2) in the first embodiment, set forth above.

In the modified example of the first embodiment, as described above, the server device 70 may be a mobile information terminal (smart phone) driven by a battery 72. Given this, the controlling portion 71 may be structured so as to perform control so as to not only acquire remaining battery information for the mobile information terminal, but also so as to not publish, to the client machine 30 (40, 50), in the playback format list (that is, to delete from the playback format list) that playback format information evaluated as producing an impediment to the playback operation in the client machine 30 (40, 50) due to an increase in the processing load accompanying the conversion of the content data to the playback format when the remaining battery capacity in the server device 70, ascertained based on the remaining battery capacity information, is less than a specific amount. This makes it possible to prevent, in advance, the server device 70 falling into a state wherein operation is not possible, due to inadequate battery capacity of the battery 72, at the time of a conversion of the playback format based on the selected playback format information when the server device 70 is a mobile information terminal and the remaining battery capacity thereof is less than a specific amount. The other effects of the modified example of the first embodiment may be the same or similar as the effects of the first embodiment, described above.

Second Embodiment

A second embodiment will be explained with reference to FIG. 1, FIG. 2, FIG. 8, and FIG. 9. Unlike the first embodiment, set forth above, in the second embodiment the explanation will be for an example wherein, in a server device 210 (referencing FIG. 2), in addition to the acquisition of the processing capability information of the client machines based on an instruction from the controlling portion 211, the playback format list (referencing FIG. 9) is generated based on "playback history information" that is added to the selected playback format information. Those structures that are identical to those in the first embodiment, described above, may be illustrated with the same codes as in the first embodiment.

The server device 210 in the second embodiment of the present invention, as illustrated in FIG. 2, may be provided with a controlling portion 211.

For example, in the second embodiment, the following control detail may be added to the server device 210. Specifically, in the server device 210 the structure may be such that, when content data in the home network 100 (referencing FIG. 1) is played back on a client machine 30 (40, 50), "playback history information" is added to the selected playback format information. That is, as illustrated in FIG. 8, the structure may be such that playback history information for the content data that has been played back in the past or that is being played back at the present point in time is recorded in each playback format information (resource information), based on an instruction from the controlling portion 211. Moreover, this playback history information, a playback format list is stored in a main memory 18 (referencing FIG. 2).

Figure 9:
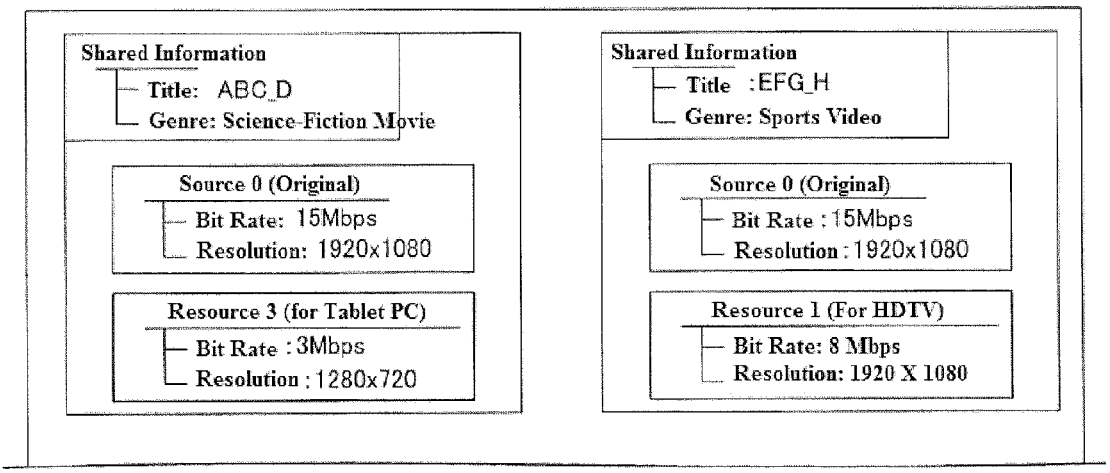
FIG. 9 is a schematic diagram illustrating the configuration of a server device according to a second embodiment of the present invention.

Consequently, based on an instruction from the controlling portion 211, playback format information with a relatively high selection frequency, ascertained based on the playback history information (which, in this case, are "Resource 0" and "Resource 3," which are the two playback format information that are relatively new, calculated from the date of the latest playback) can be published to the client machine 30 (40, 50) in the playback format list. On the other hand, the structure may be such that the playback format information wherein the selection frequency is relatively low, based on the playback history information (which in this case are "Resource 1" and "Resource 2," which are the two playback format information that are relatively old, calculated from the date of the latest playback) are deleted rather than being published to the client machine 30 (40, 50) in the playback format list. As a result, the playback format list published on the home network 100 by the server device 210 may be modified (corrected) to contain information such as illustrated in FIG. 9. That is, the data size of the playback format list may be reduced to an appropriate size (an intermediate level) based on the playback history information (referencing FIG. 8).

While in FIG. 8 the playback history information that is added to the playback format information is shown for the content titled "ABC_D," similar information is added for the other content as well.

An example of a process flow in the controlling portion 211 at the time of playback of digital content on the client machine 30 (40, 50) using the server device 210 according to the second embodiment will be explained next referencing FIG. 2 and FIG. 8 through FIG. 10.

Figure 10:
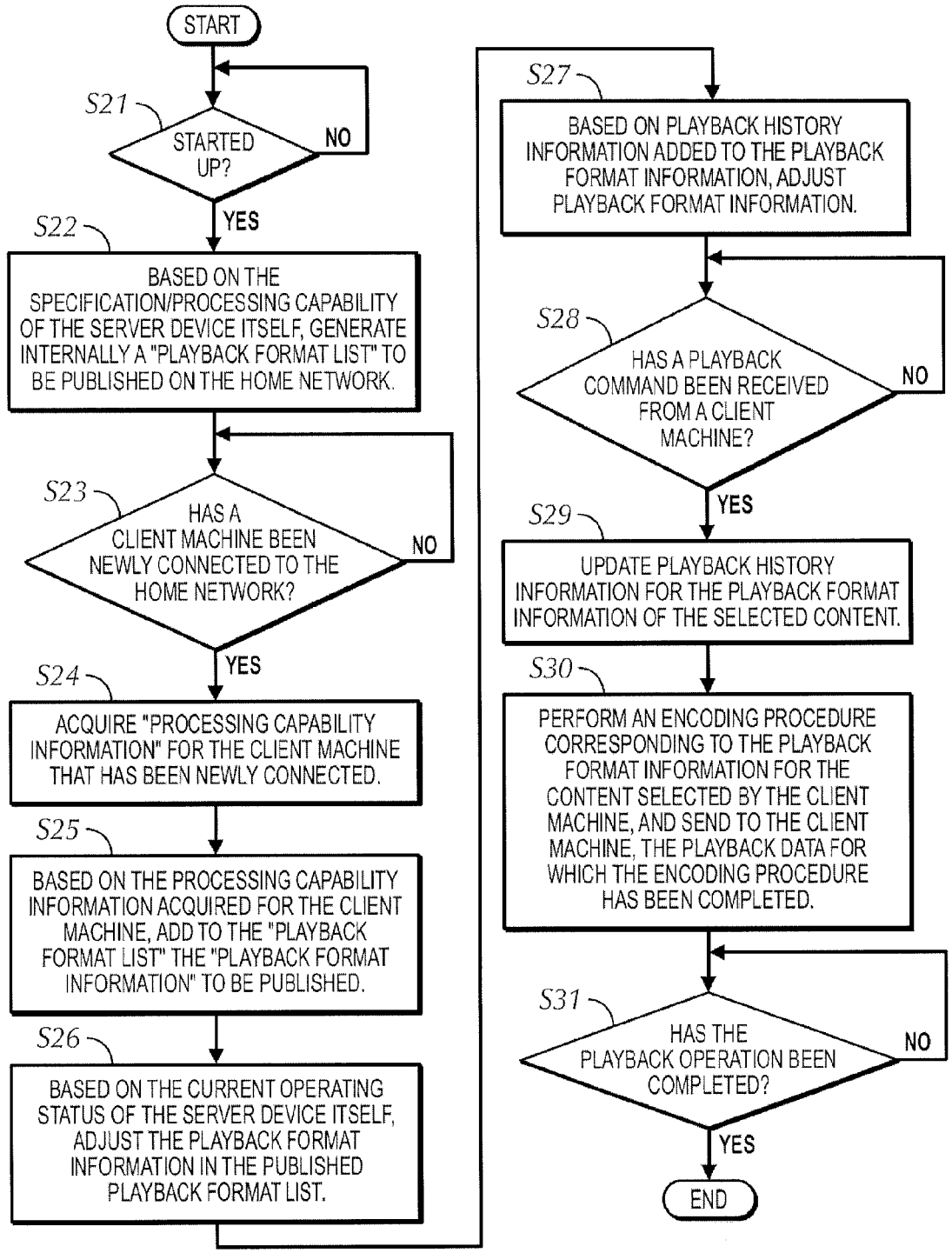
FIG. 10 is a diagram showing the flow of control in the controlling portion when playing back content data on a client machine using the server device of the second embodiment of the present invention.

As illustrated in FIG. 10, first the control detail of Step S21 through Step S26 may be identical to the control detail of Step S1 through Step S6 in the control flow in the first embodiment, set forth above (referencing FIG. 5). Consequently, the explanations thereof will be omitted here.

Here, in the second embodiment, after the procedures up to Step S26 have been performed, then, in Step S27, control may be performed by the controlling portion 211 (referencing FIG. 2) so as to correct (update) automatically the content of the playback format list based on the playback history information (referencing FIG. 8) that is added to the playback format information.

For example, when "playback history information," such as illustrated in FIG. 8, has been added to the playback format list, control is performed so that the playback format information wherein the selection frequency is relatively high, discerned based on the playback format information (which, in this case, is "Resource 0" and "Resource 3") are set so as to enable publication to the client machine 30 (40, 50) in the playback format list, and so that the playback format information wherein the selection frequency is relatively low (which in this case is "Resource 1" and "Resource 2") are deleted without being published to the client machine 30 (40, 50) in the playback format list. As a result, the playback format list published on the home network 100 may be corrected by the server device 210 to contain the information such as illustrated in FIG. 9.

Following this, in Step S28, an evaluation may be performed by the controlling portion 211 as to whether or not the server device 210 has received a playback command from the client machine 30 (40, 50), where the evaluation is repeated until there is an evaluation that the server device 210 has received a playback command from a client machine. Moreover, in Step S28, there has been an evaluation by the controlling portion 211 that the server device 210 has received a playback command from a client machine, processing advances to Step S29.

Here, in the second embodiment, in Step S29 control may be performed so as to update the playback history information for the playback format information for the selected content. That is, if, in FIG. 8, the content title is "ABC_D" and the content is played back based on "Resource 2" by the client machine 40, then the latest playback date field is overwritten with the current date (the date the time of playback), so as to be updated. Moreover, this causes the published/non-published priority (sequence) of the individual playback format information in "Resource 0" through "Resource 3" to be reordered. In this way, each time the procedure in Step S29 is performed, a modification (correction) is made to the content of the information of the playback format list (referencing FIG. 9) in cooperation with the playback history information (referencing FIG. 8).

Continuing with this example, in Step S30, content data may be distributed from the server device 210 to the client machine 30, based on an instruction from the controlling portion 211, so as to respond to the request signal from the client machine 50. At this time, in the server device 210 an encoding procedure may be performed on the original content data, by the transcoder 14, to convert from the format of the original content data to a playback format that can be played back by the client machine 50. Explaining using the example illustrated in FIG. 9, the original content data titled "ABC_D," for example, is subjected to an encoding procedure based on the playback format information of "Resource 3" that corresponds to the processing capability information for the client machine 50. That is, the original content data is converted into a playback format wherein the bit rate is 3 Mbps and the display resolution is 1280×720 pixels. Moreover, in Step S30, along with the encoding procedure, the content data is sent to the client machine 50, based on an instruction from the controlling portion 211, sequentially from the data for which the encoding procedure has been completed.

Thereafter, in Step S31, an evaluation may be performed by the controlling portion 211 as to whether or not the playback operation of the content data in the client machine 50 has been completed, where this evaluation is repeated until there is an evaluation that the playback operation of the content data in the client machine 50 has been completed. Moreover, in Step S31, there may be an evaluation by the controlling portion 211 that the playback of the content in the client machine 50 has been completed, this control procedure in the server device 210 is ended.

The other structures of the server device 210 in the second embodiment may be identical to the structures of the server device 10 in the first embodiment, set forth above.

As described in the example above, in the second embodiment, in the server device 210 the structure may be such that playback history information (referencing FIG. 8) is added to the selected playback format information when content data is played back on the client machine 30 (40, 50). Moreover, the controlling portion 211 may be structured so as to perform control so that the playback format information wherein the selection frequency is relatively high (feedback more recently), ascertained based on the playback history information, is set so as to be able to be published to the client machine 30 (40, 50) in the playback format list, and the playback format information wherein the selection frequency is relatively low (played back at an older point in time) is deleted, rather than being published to the client machine 30 (40, 50) in the playback format list. Doing so makes it possible to increase or decrease, in the playback format list, the number of playback format information that can be selected on the client machine 30 (40, 50) side based on the playback history information for the content, which has been added to the selected playback format information. That is, while the more recent the point in time at which the playback format information has been selected, the higher the priority with which it remains referenceable in the priority format list, the priority for referencing old playback format information, selected at a relatively old point in time, is demoted. Adjusting the number of playback format information in this way so as to be appropriate makes it possible to reduce, to an appropriate scope, the data size of the playback format list that is published on the home network 100. The other effects of the second embodiment are identical to the effects of the first embodiment, described above.

The embodiments disclosed herein must be considered to be illustrative in all points, and are not limiting. The scope of the present invention is set forth in the Scope of Patent Claims, not the explanations in the embodiments set forth above, and, additionally, all modifications within meanings and scopes equivalent to those in the Scope of Patent Claims are included.

For example, while the first embodiment, the modified example of the first embodiment, and the second embodiment, set forth above, were presented as examples wherein the structure was such that a specific communication command (command signal) was sent from a controlling portion 11 through a communicating portion 15 to client machines 30, 40, and 50 to acquire processing capability information for the individual client machines, the present invention is not limited thereto. For example, a control flow such that when a client machine is connected to the home network (the communication network), the processing capability information (the device capability description) of the local machine is reported from the client machine to the server device may be added. That is, the structure may be one wherein the processing capability information (the device capability description) of the local machine is present in the client machine, regardless of whether or not it is connected to the home network.

Furthermore, while the first embodiment, the modified example of the first embodiment, and the second embodiment, set forth above, were presented as examples wherein the controlling portion 11 (71, 211) was structured so as to perform control so as to delete, from the playback format list, playback format information evaluated as producing an impediment to the playback operation, so as to not be included in the playback format list that is published to the home network 100 (handled as non-published), the present invention is not limited thereto. That is, rather than completely deleting, from the playback format list, playback format information evaluated as producing an impediment to the playback operation, or wherein the probability of a playback operation is low, from the perspective of the data transfer rate, the remaining capacity of the battery, the age of the playback history, or the like, instead control may be performed so as to not publish them to the client machine 30 (40, 50) by causing them to essentially vanish from the playback format list.

Moreover, though the first embodiment, the modified example of the first embodiment, and the second embodiment, set forth above, were presented as examples wherein playback format information evaluated as producing an impediment to the playback operation, or as having a low probability of a playback operation being performed, from the perspective of the data transfer rate, remaining capacity of the battery, age of the playback history, or the like, was handled as non-published, the present invention is not limited thereto. Instead, the priority of the playback format information, when it comes to publishing/not publishing, in the playback format list may be adjusted. For example, the priority of the playback format information in regards to publishing/not publishing may be adjusted based on the number of times of playback, rather than on the playback history for the individual content.

Moreover, though the second embodiment, set forth above, presented an example wherein playback history information was managed including all playback format information (resource information) for which a playback request has been received from a client machine in the past, as illustrated in FIG. 8, the present invention is not limited thereto. That is, playback format information relating to a client machine that, despite having had a playback request to perform playback for the particular client machine at some point in time in the past, has not performed playback for a specific amount of time since then, may be deleted from the playback format list. Because client machines themselves have improvements and machine performance capabilities over the years, continuing to store, in the server device, playback format information relating to an old client machine, notwithstanding the playback frequency thereof being low, can be considered to be of minimal practical value. Consequently, at the point in time that a new client machine is connected to the home network, new playback format information is produced and the playback format list is updated. Moreover, even if an old client machine is connected, the processing capability information for that client machine can be obtained at the point in time that it is connected, and so this produces no problem in operation.

Moreover, though the first embodiment, the modified example of the first embodiment, and the second embodiment were presented as examples wherein the home network 100 was structured from minimal units, showing only three client machines 30, 40, and 54a single server device 10, the present invention is not limited thereto. That is, a plurality of server devices (DMSs) and client machines (DMPs and DMRs) may all be connected to an access point 90. Moreover, the structure may be such that, in this case, between each server device and plurality of client machines, respective playback format lists may be generated through the control in the present invention, and published on the home network.

Moreover, though the modified example of the first embodiment, set forth above, was presented as an example wherein a mobile information terminal (smart phone) was used in the server device 70 as one example of a "server device" according to the present invention, the present invention is not limited thereto. For example, an information terminal device of a tablet type may be used instead of the smart phone, or an electronic device such as a digital camera may be used.

Moreover, though the first embodiment, the modified example of the first embodiment, and the second embodiment, set forth above, were presented as examples wherein the home network 100 was structured from a server device 10 and client machines 30, 40, and 50, as DLNA-Certified™ devices that have received device certification from the DLNA, the present invention is not limited thereto. That is, the present invention may be applied instead to cooperative operation between a "server device" and a "client machine" in the communication network when the communication network is structured from a "server device" and "client machines" that provide communication functions based on a communication standard other than that of DLNA-Certified™ devices.

Moreover, though, for convenience in explanation, in the first embodiment and the second embodiment, set forth above, the explanations used flow-driven flow charts wherein procedures were performed sequentially along the process flow, when explaining the control in the controlling portion 11 (211) of the server device 10 (210), the present invention is not limited thereto. In the present invention, the control procedures of the controlling portion 11 (211) may be performed through procedures of an event-driven type, where procedures are executed by the event unit. In this case, the control may be performed completely in an event-driven type, or may be performed by a combination of event-driven and flow-driven.

While the invention has been described with respect to a limited number of embodiments, those skilled in the art, having benefit of this disclosure, will appreciate that other embodiments can be devised which do not depart from the scope of the invention as disclosed herein. Furthermore, those of ordinary skill in the art would appreciate that certain components or "portions" of one or more embodiments of the present invention may be implemented by a circuit, processor, etc. using known methods. Accordingly, the scope of the invention should be limited only by the attached claims.

EXPLANATION OF CODES 10, 210: Server Devices (Digital Media Servers)
11, 71, 211: Controlling Portions
15: Communicating Portion
30, 40, 50: Client Machines (Digital Media Player)
70: Server Device (Mobile Information Terminal, Digital Media Server)
72: Battery
100: Home Network (Communication Network)

What is claimed is:

1. A server device comprising:
a communicating portion that sends content data to a client machine; and
a controlling portion that:
acquires processing capability information of the client machine that plays back the content data,
acquires an operating status of the server device, and
generates a playback format list that includes playback format information corresponding to the content data, based on, at least, the processing capability information of the client machine and the operating status of the server device,
wherein the communicating portion sends to the client machine the content data that is converted into a playback format based on the playback format information selected.

2. The server device as set forth in claim 1, wherein the processing capability information of the client machine includes display resolution information for display resolution that can be displayed by the client machine, and the controlling portion produces the playback format list that includes the playback format information corresponding to the content data based on the display resolution information.

3. The server device as set forth in claim 1, wherein the controlling portion ascertains a data transfer rate of the content data depending on processing capability of the client machine, and the controlling portion generates the playback format information corresponding to the content data into the playback format list based on the processing capability information for the client machine and on the data transfer rate that depends on the processing capability of the client machine.

4. The server device as set forth in claim 1, wherein the playback format list is published referenceably by the client machine, and the controlling portion performs control so as to:
make publishable to the client machine the playback format information in the playback format list that can be selected by the client machine side, when a processing load on the server device as discerned based on the operating status is small, and not publish to the client machine the playback format information in the payback format list that is evaluated as producing an impediment to playback operation in the client machine due to an increase in the processing load accompanying the conversion of the content data to the playback format, when the processing load on the server device is large.

5. The server device as set forth in claim 1, further comprising a mobile information terminal driven by a battery, wherein
the controlling portion performs control so as to: acquire remaining battery capacity information for the mobile information terminal and not publish to the client machine playback format information in the playback format list that is evaluated as producing an impediment to playback operation in the client machine due to an increase in the processing load accompanying the conversion of the content data to the playback format, when the remaining battery capacity in the server device, ascertained based on the remaining battery capacity information, is less than a specific amount.

6. The server device as set forth in claim 1, wherein playback history information is added to the selected playback format information when content data is played back on the client machine, and
the controlling portion performs control so as to: make publishable to the client machine the playback format information in the playback format list for which a selection frequency, ascertained based on the playback history information, is relatively high, and not publish to the client machine playback format information in the playback format list for which the selection frequency is relatively low.

7. The server device as set forth in claim 1, wherein the server device and the client machine each receive device certification through DLNA, and are digital media server and a digital media player that can recognize each other by performing communication through a home network, the controlling portion acquires processing capability information of the digital media player that plays the content data and generates a playback format list that includes playback format information corresponding to the content data, based on, at least, the processing capability information acquired for the digital media player, and the content data is converted into a playback format based on the playback format information selected by the digital media player side from the playback format list, and is sent to the digital media player through the communicating portion of the digital media server.

8. A network system comprising:
a client machine;
and a server device comprising:
a communicating portion that sends content data to the client machine, and
a controlling portion that:
acquires processing capability information of the client machine that plays back the content data,
acquires an operating status of the server device, and
generates a playback format list that includes playback format information corresponding to the content data, based on, at least, the processing capability information required for the client machine and the operating status of the server device,
wherein the communicating portion sends to the client machine the content data that is converted into a playback format based on the playback format information selected.

9. The server device as set forth in claim 2, wherein the controlling portion ascertains a data transfer rate of the content data depending on processing capability of the client machine; and the controlling portion generates the playback format information corresponding to the content data into the playback format list based on the processing capability information for the client machine and on the data transfer rate that depends on the processing capability of the client machine.

10. The server device as set forth in claim 2, wherein the playback format list is published, referenceably by the client machine, and the controlling portion performs control so as to: make publishable to the client machine the playback format information in the playback format list that can be selected by the client machine side, when a processing load on the server device as discerned based on the operating status is small, and not publish to the client machine the playback format information in the payback format list that is evaluated as producing an impediment to playback operation in the client machine due to an increase in the processing load accompanying the conversion of the content data to the playback format, when the processing load on the server device is large.

11. The server device as set forth in claim 3, wherein the playback format list is published referenceably by the client machine, and the controlling portion performs control so as to: make publishable to the client machine the playback format information in the playback format list that can be selected by the client machine side, when a processing load on the server device as discerned based on the operating status is small, and not publish to the client machine the playback format information in the payback format list that is evaluated as producing an impediment to playback operation in the client machine due to an increase in the processing load accompanying the conversion of the content data to the playback format, when the processing load on the server device is large.

12. The server device as set forth in claim 2, further comprising a mobile information terminal driven by a battery, wherein the controlling portion performs control so as to: acquire remaining battery capacity information for the mobile information terminal and not publish to the client machine playback format information in the playback format list that is evaluated as producing an impediment to playback operation in the client machine due to an increase in the processing load accompanying the conversion of the content data to the playback format, when the remaining battery capacity in the server device, ascertained based on the remaining battery capacity information, is less than a specific amount.

13. The server device as set forth in claim 3, further comprising a mobile information terminal driven by a battery, wherein the controlling portion performs control so as to: acquire remaining battery capacity information for the mobile information terminal and not publish to the client machine playback format information in the playback format list that is evaluated as producing an impediment to playback operation in the client machine due to an increase in the processing load accompanying the conversion of the content data to the playback format, when the remaining battery capacity in the server device, ascertained based on the remaining battery capacity information, is less than a specific amount.

14. The server device as set forth in claim 4, further comprising a mobile information terminal driven by a battery, wherein the controlling portion performs control so as to: acquire remaining battery capacity information for the mobile information terminal and not publish to the client machine playback format information in the playback format list that is evaluated as producing an impediment to playback operation in the client machine due to an increase in the processing load accompanying the conversion of the content data to the playback format, when the remaining battery capacity in the server device, ascertained based on the remaining battery capacity information, is less than a specific amount.

15. The server device as set forth in claim 2, wherein playback history information is added to the selected playback format information when content data is played back on the client machine, and the controlling portion performs control so as to: make publishable to the client machine the playback format information in the playback format list for which a selection frequency, ascertained based on the playback history information, is relatively high, and not publish to the client machine playback format information in the playback format list for which the selection frequency is relatively low.

16. The server device as set forth in claim 3, wherein playback history information is added to the selected playback format information when content data is played back on the client machine, and the controlling portion performs control so as to: make publishable to the client machine the playback format information in the playback format list for which a selection frequency, ascertained based on the playback history information, is relatively high, and not publish to the client machine playback format information in the playback format list for which the selection frequency is relatively low.

17. The server device as set forth in claim 4, wherein playback history information is added to the selected playback format information when content data is played back on the client machine, and the controlling portion performs control so as to: make publishable to the client machine the playback format information in the playback format list for which a selection frequency, ascertained based on the playback history information, is relatively high, and not publish to the client machine playback format information in the playback format list for which the selection frequency is relatively low.

18. The server device as set forth in claim 5, wherein playback history information is added to the selected playback format information when content data is played back on the client machine, and the controlling portion performs control so as to: make publishable to the client machine the playback format information in the playback format list for which a selection frequency, ascertained based on the playback history information, is relatively high, and not publish to the client machine playback format information in the playback format list for which the selection frequency is relatively low.

19. The server device as set forth in claim 2, wherein the server device and the client machine each receive device certification through DLNA, and are digital media server and a digital media player that can recognize each other by performing communication through a home network, the controlling portion acquires processing capability information of the digital media player that plays the content data and generates a playback format list that includes playback format information corresponding to the content data, based on, at least, the processing capability information acquired for the digital media player, and the content data is converted into a playback format based on the playback format information selected by the digital media player side from the playback format list, and is sent to the digital media player through the communicating portion of the digital media server.

* * * * *